United States Patent [19]

King et al.

[11] 4,269,909
[45] May 26, 1981

[54] SODIUM-SULFUR CELL WITH METHOD OF CONSTRUCTING THE SULFUR ELECTRODE

[75] Inventors: Randall N. King, Johnstown; Stephan P. Mitoff, Clifton Park, both of N.Y.

[73] Assignee: Electric Power Research Institute, Palo Alto, Calif.

[21] Appl. No.: 113,280

[22] Filed: Jan. 18, 1980

[51] Int. Cl.³ .................................................. H01M 4/36
[52] U.S. Cl. ..................................... 429/104; 29/623.2
[58] Field of Search ........................ 429/104, 101–103; 29/623.1, 623.2, 623.5

[56] References Cited

U.S. PATENT DOCUMENTS

| | | | |
|---|---|---|---|
| 4,011,367 | 3/1977 | Evans et al. | 429/104 |
| 4,076,903 | 2/1978 | Sudworth et al. | 429/104 |
| 4,140,841 | 2/1979 | Breiter et al. | 429/104 X |
| 4,146,684 | 3/1979 | Fischer et al. | 429/104 |

*Primary Examiner*—Charles F. LeFevour
*Attorney, Agent, or Firm*—Flehr, Hohbach, Test

[57] ABSTRACT

A sodium-sulfur cell is disclosed herein along with a method of constructing its sulfur electrode. The cell includes means containing a supply of sodium, an elongated housing joined at one end with sodium containing means, a beta-alumina electrolyte tube located within and extending from the joined end of the housing so as to define a compartment within the housing around the tube. A mixture including sulfur and an electrically conductive filler is disposed within the compartment and forms the cells sulfur electrode. In constructing this electrode, sufficient space is initially provided within the cell compartment around the beta-alumina electrolyte tube to allow for expansion of the sulfur when the latter converts from its solidified state during initial storage to its molten state during operation of the cell, thereby minimizing the possibility of damage to the electrolyte tube as a result of this expansion.

7 Claims, 4 Drawing Figures

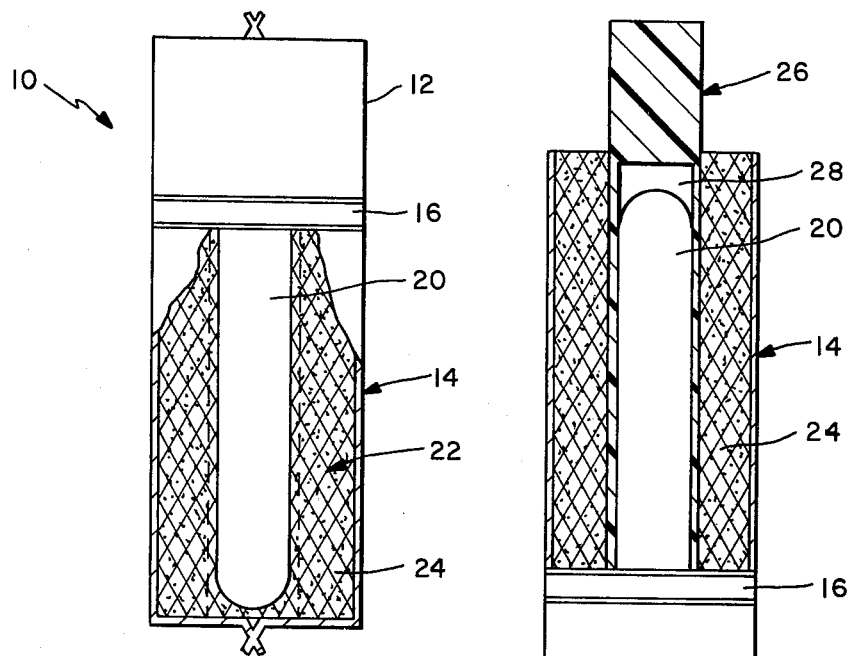
FIG.—1
FIG.—2
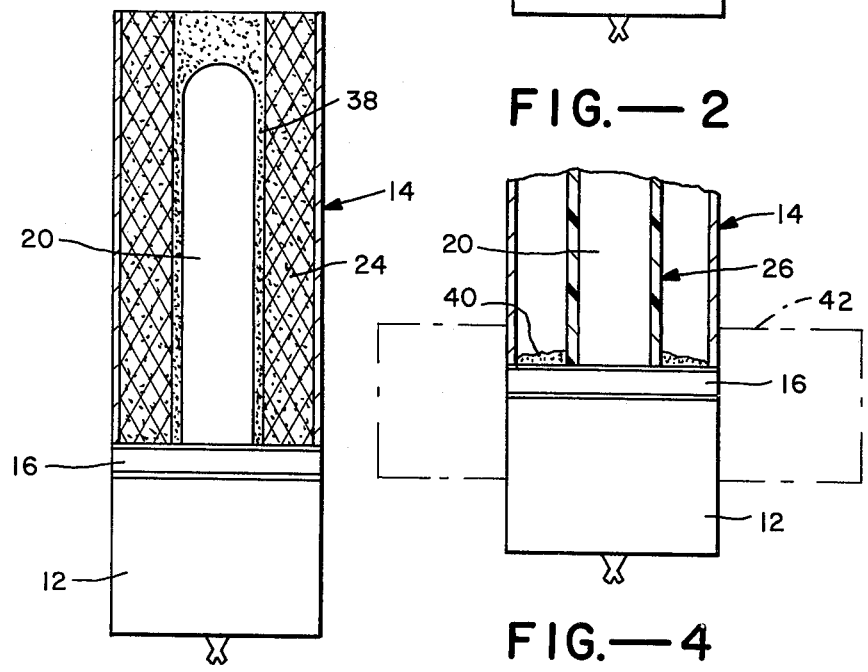
FIG.—3
FIG.—4

SODIUM-SULFUR CELL WITH METHOD OF CONSTRUCTING THE SULFUR ELECTRODE

The present invention relates generally to sodium-sulfur cells and more particularly to a method of constructing its sulfur electrode.

A typical sodium-sulfur cell of the type to which the present invention is directed includes means containing a supply of sodium which serves as one cell electrode, e.g., the sodium electrode, an elongated housing joined at one end with the sodium containing means and a betaalumina electrolyte tube located within and extending from the joined end of the housing so as to define a compartment within the housing and around the tube. The cell also includes a mixture including sulfur and electrically conductive filler such as graphite disposed within the compartment and serving as a second cell electrode, e.g., the cell's sulfur electrode. In constructing a cell of this type, the sulfur is normally added to the compartment in a molten state after the compartment is filled with the graphite or other such filler. The graphite not only serves as an electrical conductor but also acts as a sponge and takes up the sulfur so as to provide a firm electrode after solidification.

It should be apparent from the foregoing that once the sulfur electrode is provided, that is, once the compartment recited above is filled with the mixture of graphite or other such filler and sulfur, this mixture surrounds and actually encases the beta-alumina electrolyte tube. It should also be apparent that the initial cooling and solidification of the sulfur after the latter is first combined with the graphite in the cell compartment does not harm the electrolyte tube. However, when the cell is thereafter brought up to its operating temperature causing the solidified sulfur to again melt, the thermal expansion of the sulfur within the confines of the cell compartment has in some cases caused the beta tube to crack. This in turn causes the cell to short circuit between its electrodes, possibly resulting in a hazardous condition when the molten sodium and sulfur react directly with one another. The heat generated from this type of reaction may exceed 1,000° C.

One previously suggested method of overcoming the foregoing problem has been to recast plugs of the sulfur electrode mixture to fit within the cell compartment surrounding the beta-alumina electrolyte tube so as to leave room for the sulfur and eliminate the possibility of damage to the electrolyte tube. This plug is initially molded into a cylindrical shape and subsequently drilled through its center to accomodate the electrolyte tube. In some cases, the cylinders are cut in half lengthwise or in three sections 120° each for a better fit and easier assembly. While this premolded technique is a viable solution to the problem of sulfur expansion, it requires a relatively complicated, time consuming and costly machine casting process.

In view of the foregoing, one object of the present invention is to provide an uncomplicated, reliable and yet economical solution to the problem of sulfur expansion.

A more particular object of the present invention is to provide a method of forming a sulfur electrode in the compartment of a sodium-sulfur cell and around the electrolyte tube of the latter such that the sulfur has sufficient room in which to expand without damaging the electrolyte tube.

As will be seen hereinafter, in carrying out the foregoing objects, the sulfur electrode is constructed by first positioning a cover sleeve within the cell compartment around the beta-alumina electrolyte tube. Thereafter, the available space within the compartment between the cover sleeve and the housing is filled with a mixture of sulfur and the electrically conductive filler, e.g., the graphite. In a preferred embodiment, the filler is first placed within the available space and then the sulfur is added in a molten state. After providing this mixture, the sulfur is allowed to cool and solidify, if not already solid, thereby providing a solid mixture around the cover tube. At that time, the sleeve is removed from the compartment leaving a space around the electrolyte tube. This space is filled with additional filler without sulfur.

In this way, subsequent melting of the solidified sulfur will expand within the entire compartment without exerting a force on the electrolyte tube sufficient to damage the latter.

The foregoing features of the sodium-sulfur cell disclosed herein as well as other features will be discussed in more detail hereinafter in conjunction with the drawing wherein:

FIG. 1 is a longitudinal view of a sodium-sulfur cell in a vertical operating position and partially broken away to illustrate its sulfur electrode which has been provided in accordance with the present invention;

FIG. 2 is a view partially in section showing the cell of FIG. 1 in a partially assembled state to illustrate an initial step in providing its sulfur electrode;

FIG. 3 is a view similar to FIG. 2 but illustrating the cell further along in its assembly; and FIG. 4 is a view similar to FIGS. 2 and 3 but illustrating a possible additional step in the construction of the cell's sulfur electrode.

Turning now the drawing wherein like components are designated by like reference numerals throughout the four figures, attention is directed to FIG. 1 which illustrates a sodium-sulfur cell generally designated by the reference numeral 10. This cell includes a top housing 12 containing a supply of sodium (not shown) forming one cell electrode, e.g., the sodium electrode. The cell also includes a bottom housing 14 which is connected at its top end with and separated from housing 12 by an alpha header 16. The top end of housing 12 and the bottom end of housing 14 are sealed, as illustrated in FIG. 1, and while not illustrated, the alpha header includes a through hole extending between the two housing. This through hole serves to place the interior of housing 12, e.g., the sodium therein, in fluid communication with the interior of a beta-alumina electrolyte tube 20 which is located within housing 14 and which includes an opened top end fixedly positioned around the throughhole. The bottom end of the electrolyte tube is closed so that sodium contained within housing 12 passes by means of gravity into and fills the interior of the beta-alumina electrolyte tube.

The components of sodium-sulfur cell 10 thus far described may be readily provided by those with ordinary skill in the art and do not individually form part of the present invention. Therefore, a further description of these components or the way they are assembled will not be provided herein except where necessary to a better understanding of the present invention.

Sodium-sulfur cell 10 also includes a sulfur electrode which is comprised of a mixture of sulfur and an electrically conductive filler which is typically graphite but which may be other suitable material compatible with the present invention. This mixture generally indicted at 22 in FIG. 1 extends throughout the compartment 24 which is defined by the interior of housing 14 around the outer surface of electrolyte tube 20. As seen in FIG. 1, the sulfur electrode fills all of the available space within compartment 24 and in this way encapsulates the beta-alumina tube. During initial assembly of the cell, the sulfur comprising part of mixture 22 is provided in liquid state and thereafter solidified before the cell is placed in use as will be seen thereinafter. In subsequently placing the cell in use, the sulfur is again melted, thereby expanding within compartment 24. However, in accordance with the present invention, as will also be seen hereinafter, the sulfur mixture is initially provided within compartment 24 such that the subsequent expansion of the sulfur will occur without exerting a force on the electrolyte tube sufficient to damage the latter.

Referring now to FIG. 2, cell 10 is shown partially assembled, that is, its housing containing sodium is shown assembled with housing 14, alpha header 16 and beta-alumina tube 20. However, the top end of housing 14 is opened, thereby providing access to compartment 24. With the cell in this partially assembled condition, construction of sulfur electrode may be initiated. The first step in this procedure is to provide an elongated cover sleeve 26 which is shown only in FIG. 2. This cover sleeve includes an open bottom end which provides access to its longitudinally extending interior passageway 28 sufficiently long and of sufficient cross-sectional shape to receive in a loose slidable manner the entire length of the beta-alumina tube 20. While the top end of the cover sleeve illustrated is closed, it may be provided with an opening in communication with the passageway 28 or the passageway itself may extend entirely through the cover sleeve.

Cover tube 26 may be made of any suitable material compatable with the present invention. In a preferred embodiment it is constructed of Teflon (a trademark) material.

In providing the sulfur electrode in compartment 24, the sleeve just described is positioned within the compartment over and around the electrolyte tube as shown in FIG. 2. The remaining available space 24 within the compartment between the cover sleeve and housing is then filled with a mixture of sulfur and graphite or other such electrically conductive filler. Molten sulfur could initially be mixed with the filler and thereafter solidified and this mixture could be disposed around the cover sleeve in a single step. However, in a preferred embodiment of the present invention, the filler without the sulfur is initially disposed around the sleeve filling available space 24' between the latter and the housing. Thereafter, molten sulfur is added to the filler. During this procedure, the entire cell is maintained at a sufficiently high temperature to prevent the sulfur from solidifying, specifically a temperature of 125° C. in a preferred embodiment. After all of the sulfur has been added, the cell is allowed to cool so as to solidify the sulfur, thereby forming a solid mixture of sulfur and filler within space 24'.

Whether or not mixture 22 is added in one step or in two steps as preferred, the amount of filler disposed within the space 24' between sleeve 26 and housing 14 is not the total filler making up the sulfur electrode illustrated in FIG. 1. This is because additional filler is added to compartment 24 after removal of the sleeve, as will be discussed hereinafter. In order to provide the proper total portion of the filler to the overall mixture, the amount of filler actually placed within available space 24' (prior to removal of sleeve 26) relative to the total amount of filler to be added, is proportional to the volume of available space 24' relative to the total space in the compartment 24. Once the mixture of sulfur and filler has been provided around the cover sleeve 26 in the manner illustrated in FIG. 2, the sulfur is allowed to cool and solidify if not already solid, as stated previously. Thereafter, the cover tube 26 is removed from compartment 24 leaving a space 38 in its place as illustrated in FIG. 3. In order to remove the cover sleeve it may be necessary to twist the latter or provide its upper closed end with an opening if one does not already exist. Moreover, the material making up the sleeve should be selected to minimize friction between its outer surface and the sulfur-filler mixture. Teflon material is preferred in this regard, as stated previously. In order to facilitate withdrawal of this sleeve its outer surface is preferrably tapered inward from its top closed end to its bottom open end, as seen in FIG. 2.

Once the cover sleeve is removed, space 38 is filled with the same filler material making up the previously provided mixture of sulfur and filler but without the sulfur. It is this resilient layer of filler, e.g., the graphite surrounding the beta-alumina tube that acts as a cushion and takes up the forces exerted by the sulfur as the latter expands during initial operation of the cell when the sulfur is again melted. The cushion of graphite protects the electrolyte tube from direct contact with the sulfur as the latter melts and provides space for the latter to expand without damaging the electrolyte tube. After the filler by itself is provided around the electrolyte tube including around its top end, the top end of housing 14 is closed utilizing a suitable end cap which may be an extension of housing 14 or it may be separate. This completes construction of the cell including its sulfur electrode.

Referring to FIG. 4, attention is directed to a technique for providing a seal around the bottom, open end of sleeve 26 to prevent molten sulfur which is added to space 24' between the sleeve and the housing from entering between the inner wall of the sleeve and the outer surface of the electrolyte tube, that is, into passageway 28 of the sleeve. The seal which is generally indicated at 40 extends entirely around the bottom end portion of the cover sleeve at the bottom end of available space 24'. This seal is provided after the cover sleeve has been positioned around electrolyte tube 20. More specifically, after positioning the cover sleeve manner illustrated in FIG. 2 and before filling the available space 24' in the manner described previously, a small amount of graphite is added to the bottom of the available space all the way around the bottom end of the sleeve directly on top of alpha header 16. This is followed by a small amount of molten sulfur, for example, a few cubic centimeters in volume. This combination is allowed to solidify and is kept cool by chill blocks indicated by dotted lines at 42 during the rest of the filling procedure described above. The chilled plug of filler and sulfur at the bottom of the available space prevents the molten sulfur from entering the available space from passing between inner wall of the sleeve and electrolyte tube.

What is claimed is:

1. A sodium sulfur cell including means containing a supply of sodium, an elongated housing joined at one end with said sodium containing means, a beta-alumina electrolyte tube located within and extending from the joined end of said housing so as to define a compartment within said housing around said tube, and a mixture including sulfur and an electrically conductive filler disposed within said compartment, said mixture being provided in said compartment in accordance with a, method comprising: positioning a cover sleeve within the compartment around said electrolyte tube; filling the available space within said compartment between said cover sleeve and housing with a mixture of sulfur and said solid filler; allowing the sulfur within said compartment to cool and solidify, if not already solid, whereby to provide a solid mixture therein; thereafter, removing said cover sleeve from said compartment leaving an empty space in its place, said empty space surrounding said electrolyte tube; and filling said empty space with electrically conductive filler without sulfur whereby subsequent melting of said solidified sulfur will expand within the entire compartment without exerting a force on said electrolyte tube sufficient to damage the latter.

2. A cell according to claim 1 wherein said filling step includes first placing said solid filler within said space and then adding said sulfur in a molten state to said filler.

3. A cell according to claim 2 wherein immediately following the positioning of said cover sleeve around said electrolyte tube, a relatively small amount of said mixture including molten sulfur is provided within said compartment around the outside end of said sleeve at the joined end of said housing and said molten sulfur is solidified to provide a seal around said one end of said sleeve when said filler and molten sulfur are subsequently added to said available space whereby to prevent said last-mentioned sulfur from reaching said electrolyte tube by passing under said one end of said cover sleeve.

4. A cell according to claim 2 wherein said cell is maintained at about 125° C. until all of said sulfur is added to said available space.

5. A cell according to claim 1 wherein, relative to the total amount of electrically conductive filler added to said compartment, the amount placed within said available space in said compartment prior to removing said cover sleeve is proportional to the volume of said available space within said compartment prior to removal of said cover sleeve relative to the total space in said compartment.

6. A cell according to claim 1 wherein said cover tube is provided with an exterior surface which tapers outwardly from a point adjacent the joined end of said electrolyte tube to the other end of said sleeve whereby to ease in the removal of the latter.

7. A sodium-sulfur cell including means containing a supply of sodium, an elongated housing joined at one end with said sodium containing means, a beta-alumina electrolyte tube located within and extending from the joined end of said housing so as to define a compartment within said housing around said tube, and a mixture including sulfur and an electrically conductive filler disposed within said compartment, said mixture being provided in said compartment in accordance with a method comprising: providing a cover sleeve having a bottom open end, an internal passageway which extends up from said open end which is sized to slidably receive the full length of said beta-alumina electrolyte tube, and an outer surface which tapers inwardly from the bottom open end of said sleeve to the top end thereof; positioning said cover sleeve within said cell compartment around said electrolyte tube; filling the available space within said compartment between said cover sleeve and housing with a mixture of sulfur and said solid filler by first placing the filler within said space and then adding said sulfur in a molten state, the amount of filler placed within said available space relative to the total amount of filler provided within said cell compartment being proportional to the volume of said available space relative to the overall space defined by said compartment; allowing the sulfur within said compartment to cool and solidify whereby to provide a solid mixture therein; thereafter, removing said cover sleeve from said compartment leaving an empty space in its place, said empty space surrounding said electrolyte tube; and filling said empty space with electrically conductive filler without sulfur whereby subsequent melting of said solidified sulfur will expand within the entire compartment without exerting a force on the said electrolyte tube sufficient to damage the latter, the amount of filler added to said space without said sulfur being proportional to the volume of said empty space relative to the total space defined in said compartment after removal of said sleeve.

* * * * *